US009556359B2

(12) United States Patent
Suzumura et al.

(10) Patent No.: US 9,556,359 B2
(45) Date of Patent: Jan. 31, 2017

(54) METHOD OF PRODUCING MEMBER FOR ELECTROPHOTOGRAPHY

(71) Applicant: CANON KABUSHIKI KAISHA, Tokyo (JP)

(72) Inventors: Noriko Suzumura, Mishima (JP); Noriyuki Doi, Numazu (JP); Hiroki Masu, Numazu (JP); Masataka Kodama, Mishima (JP); Masahiro Kurachi, Fujisawa (JP); Noriaki Kuroda, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/019,490

(22) Filed: Sep. 5, 2013

(65) Prior Publication Data
US 2014/0004258 A1 Jan. 2, 2014

Related U.S. Application Data

(63) Continuation of application No. PCT/JP2013/001779, filed on Mar. 15, 2013.

(30) Foreign Application Priority Data

Mar. 29, 2012 (JP) .................................. 2012-078170

(51) Int. Cl.
*B05D 5/12* (2006.01)
*C09D 183/06* (2006.01)
(Continued)

(52) U.S. Cl.
CPC ......... *C09D 183/06* (2013.01); *G03G 5/14704* (2013.01); *G03G 5/14708* (2013.01);
(Continued)

(58) Field of Classification Search
CPC ........ G03G 15/00; G03G 15/02; C08G 59/30; C08G 77/58; F16C 13/00; C09D 183/04
(Continued)

(56) References Cited

U.S. PATENT DOCUMENTS 6,235,101 B1 * 5/2001 Kurosawa et al. ...... 106/287.14
6,967,069 B2 * 11/2005 Wu et al. ..................... 430/59.4
(Continued)

FOREIGN PATENT DOCUMENTS

EP 1 634 928 A1 3/2006
EP 2 295 512 A1 3/2011
(Continued)

OTHER PUBLICATIONS

PCT International Search Report and Written Opinion of the International Searching Authority, International Application No. JP2013/001779, Mailing Date Apr. 23, 2013.
(Continued)

Primary Examiner — Brian K Talbot
(74) Attorney, Agent, or Firm — Fitzpatrick, Cella, Harper & Scinto

(57) ABSTRACT

Provided is a method of producing a member for electrophotography capable of providing a high-quality electrophotographic image. The method of producing a member for electrophotography is a method of producing a member for electrophotography having an electro-conductive support, an elastic layer, and a surface layer, the method comprising: a first step of forming, on a surface of the elastic layer, a coat of a surface-layer coating liquid containing a hydrolyzed condensate of a hydrolyzable silane compound and a chelate titanium compound represented by the following general formula (2); and a second step of crosslinking the hydrolyzed condensate in the coat through cleavage of an epoxy
(Continued)

group in the hydrolyzed condensate to form the surface layer:

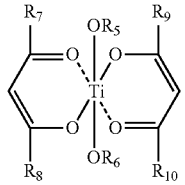

General formula (2)

5 Claims, 2 Drawing Sheets

(51) Int. Cl.
    *G03G 15/02*     (2006.01)
    *G03G 5/147*     (2006.01)
    *G03G 15/16*     (2006.01)
    *G03G 15/20*     (2006.01)
    *G03G 15/08*     (2006.01)
    *C08G 77/14*     (2006.01)

(52) U.S. Cl.
    CPC ......... *G03G 5/14773* (2013.01); *G03G 15/02* (2013.01); *G03G 15/0233* (2013.01); *G03G 15/0818* (2013.01); *G03G 15/162* (2013.01); *G03G 15/1685* (2013.01); *G03G 15/206* (2013.01); *G03G 15/2057* (2013.01); *C08G 77/14* (2013.01); *G03G 2215/00957* (2013.01)

(58) Field of Classification Search
    USPC .................................................. 427/58, 126.1
    See application file for complete search history.

(56) References Cited

U.S. PATENT DOCUMENTS

| | | | |
|---|---|---|---|
| 7,118,621 B2 * | 10/2006 | Gerritsen et al. | ........ 106/287.13 |
| 7,664,434 B2 | 2/2010 | Kuroda et al. | |
| 7,693,457 B2 | 4/2010 | Kuruma et al. | |
| 7,799,398 B2 | 9/2010 | Nakamura et al. | |
| 7,962,068 B2 | 6/2011 | Kuroda et al. | |
| 8,064,803 B2 | 11/2011 | Kuroda et al. | |
| 8,092,358 B2 | 1/2012 | Kuruma et al. | |
| 8,227,087 B2 | 7/2012 | Mayuzumi et al. | |
| 8,277,947 B2 | 10/2012 | Mayuzumi et al. | |
| 8,383,234 B2 | 2/2013 | Mayuzumi et al. | |
| 8,401,425 B2 | 3/2013 | Kuroda et al. | |
| 8,469,867 B2 | 6/2013 | Kuroda et al. | |
| 8,501,325 B2 | 8/2013 | Tomomizu et al. | |
| 8,503,911 B2 | 8/2013 | Suzumura et al. | |
| 8,503,916 B2 | 8/2013 | Anan et al. | |
| 8,523,748 B2 * | 9/2013 | Nagamine et al. | ............. 492/59 |
| 8,526,857 B2 | 9/2013 | Tomomizu et al. | |
| 8,548,359 B2 | 10/2013 | Taniguchi et al. | |
| 2005/0003356 A1 | 1/2005 | Hayden et al. | |
| 2005/0009956 A1 | 1/2005 | Kimura | |
| 2008/0241372 A1 | 10/2008 | Tahara et al. | |
| 2011/0182618 A1 | 7/2011 | Kuruma et al. | |
| 2011/0217072 A1 * | 9/2011 | Kuroda et al. | ................ 399/111 |
| 2012/0076535 A1 | 3/2012 | Nagamine et al. | |
| 2012/0076539 A1 * | 3/2012 | Sato et al. | .................... 399/174 |
| 2012/0082481 A1 | 4/2012 | Nagamine et al. | |
| 2012/0093539 A1 | 4/2012 | Nagamine et al. | |
| 2012/0107565 A1 | 5/2012 | Kuroda et al. | |
| 2012/0121296 A1 | 5/2012 | Kuroda et al. | |
| 2012/0141159 A1 * | 6/2012 | Nagamine et al. | ........... 399/111 |
| 2012/0148306 A1 * | 6/2012 | Tomomizu et al. | .......... 399/168 |
| 2012/0201568 A1 | 8/2012 | Kurachi et al. | |
| 2012/0288300 A1 * | 11/2012 | Matsusaki et al. | ........... 399/111 |
| 2013/0004206 A1 | 1/2013 | Kuroda et al. | |
| 2013/0034369 A1 | 2/2013 | Masu et al. | |
| 2013/0064571 A1 | 3/2013 | Kodama et al. | |

FOREIGN PATENT DOCUMENTS

| | | | |
|---|---|---|---|
| JP | 2004-258421 A | | 9/2004 |
| JP | 2004-359881 A | | 12/2004 |
| JP | 2007-4102 A | | 1/2007 |
| JP | 2007-47768 A | | 2/2007 |
| JP | 2008-299115 A | | 12/2008 |
| JP | 2010-163584 A | | 7/2010 |
| JP | 2011-154353 A | | 8/2011 |
| JP | 2012-42936 A | | 3/2012 |
| WO | 2005/087882 A1 | | 9/2005 |
| WO | WO 2006/070847 | * | 7/2006 |
| WO | 2012/023241 A1 | | 2/2012 |
| WO | 2012/023270 A1 | | 2/2012 |
| WO | 2013/060377 A1 | | 5/2013 |

OTHER PUBLICATIONS

Masu, et al., U.S. Appl. No. 14/084,148, filed Nov. 19, 2013.
Kurachi, et al., U.S. Appl. No. 14/080,790, filed Nov. 14, 2013.
European Search Report dated Sep. 25, 2015 in European Application No. 13770087.8.
Chinese Office Action dated Dec. 18, 2015 in Chinese Application No. 201380018308.2.

* cited by examiner

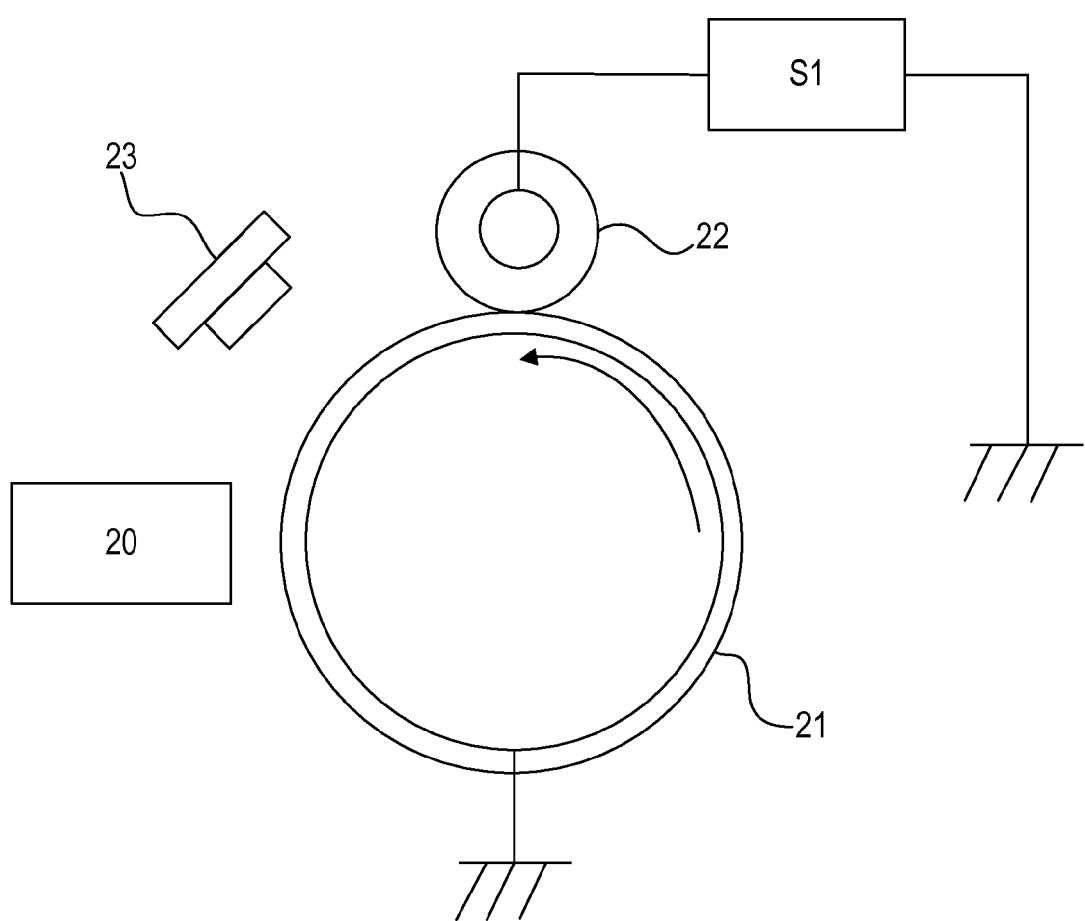

METHOD OF PRODUCING MEMBER FOR ELECTROPHOTOGRAPHY

CROSS-REFERENCE TO RELATED APPLICATIONS

This application is a continuation of International Application No. PCT/JP2013/001779, filed Mar. 15, 2013, which claims the benefit of Japanese Patent Application No. 2012-078170, filed Mar. 29, 2012.

BACKGROUND OF THE INVENTION

Field of the Invention

The present invention relates to a method of producing a member for electrophotography and a coating liquid used in formation of a film containing a polysiloxane.

Description of the Related Art

A time period for which an electrophotographic photosensitive member and a charging member are in contact with each other has become relatively short in association with an increase in speed of a process for forming an electrophotographic image in recent years. This is a disadvantageous for stable and secure charging of the electrophotographic photosensitive member. Japanese Patent Application Laid-Open No. 2011-154353 describes that a surface layer formed from a surface-layer coating liquid containing a condensate formed of a hydrolyzable silane compound and a hydrolyzable titanium compound increases a relative dielectric constant and improves charging performance of a charging member.

SUMMARY OF THE INVENTION

However, the coating liquid according to Japanese Patent Application Laid-Open No. 2011-154353 tends to be liable to react with moisture owing to the characteristics of its raw materials. Accordingly, a proper range exists for each of the amount of the hydrolyzable titanium compound and the amount of water to be used in hydrolysis. For example, when the amount of the hydrolyzable titanium compound upon preparation of the coating liquid outstrips the proper range for increasing the relative dielectric constant of the surface layer, the coating liquid is liable to cloud or to cause a precipitate. A coat of the coating liquid that has clouded or has caused a precipitate is liable to cause seediness or thickness unevenness. In addition, the charging member including the surface layer formed from such coat has a portion derived from the thickness unevenness where the relative dielectric constant is nonuniform, which may serve as a challenge in uniform charging of the surface of the electrophotographic photosensitive member.

In view of the foregoing, the present invention is directed to providing a method of producing a member for electrophotography capable of providing a high-quality electrophotographic image.

Further, the present invention is directed to providing a coating liquid to be used in the formation of a film containing a polysiloxane which is suppressed from clouding or causing a precipitate and which can suppress the occurrence of, for example, coating unevenness upon formation of a coat.

According to one aspect of the present invention, there is provided a method of producing a member for electrophotography comprising an electro-conductive support, an elastic layer, and a surface layer, the method comprising: a first step of forming, on a surface of the elastic layer, a coat of a surface-layer coating liquid containing a hydrolyzed condensate of a hydrolyzable silane compound represented by the following general formula (1) and a chelate titanium compound represented by the following general formula (2); and a second step of crosslinking the hydrolyzed condensate in the coat through cleavage of an epoxy group in the hydrolyzed condensate to form the surface layer.

$$R_1\text{—Si}\quad(OR_2)\quad(OR_3)\quad(OR_4) \qquad \text{General formula (1)}$$

General formula (2)

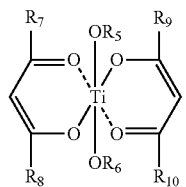

In the general formula (1), $R_1$ represents a hydrocarbon group represented by any one of the following general formulae (3) to (6), and $R_2$ to $R_4$ each independently represent a hydrocarbon group. In addition, in the general formula (2), $R_5$ and $R_6$ each independently represent a linear or branched alkyl group having 1 or more and 20 or less carbon atoms, and $R_7$ to $R_{10}$ each independently represent a hydrogen atom, an alkyl group having 1 or more and 3 or less carbon atoms, or an alkoxy group having 1 or more and 3 or less carbon atoms.

General formula (3)

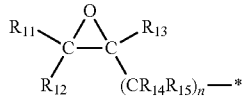

General formula (4)

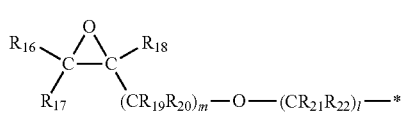

General formula (5)

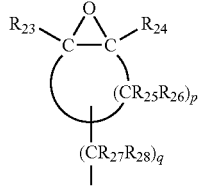

General formula (6)

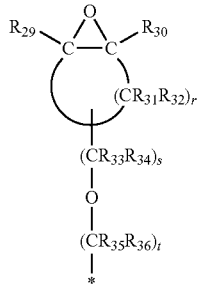

In the general formulae (3) to (6): $R_{11}$ to $R_{13}$, $R_{16}$ to $R_{18}$, $R_{23}$, $R_{24}$, $R_{29}$, and $R_{30}$ each independently represent a hydrogen atom, an alkyl group having 1 or more and 4 or less carbon atoms, a hydroxyl group, a carboxyl group, or an amino group; $R_{14}$, $R_{15}$, $R_{19}$ to $R_{22}$, $R_{27}$, $R_{28}$, and $R_{33}$ to $R_{36}$ each independently represent a hydrogen atom or an alkyl group having 1 or more and 4 or less carbon atoms; $R_{25}$, $R_{26}$, $R_{31}$, and $R_{32}$ each independently represent a hydrogen atom, an alkoxyl group having 1 or more and 4 or less carbon atoms, or an alkyl group having 1 or more and 4 or less carbon atoms; and n, m, l, q, s, and t each independently represent an integer of 1 or more and 8 or less, p and r each independently represent an integer of 4 or more and 12 or less, and "*" represents a bonding position with a silicon atom in the general formula (1).

According to another aspect of the present invention, there is provided a coating liquid for forming a film containing a polysiloxane, comprising a hydrolyzed condensate of a hydrolyzable silane compound represented by the general formula (1) and a chelate titanium compound represented by the general formula (2).

According to the present invention, there is provided the coating liquid to be used in the formation of a film containing a polysiloxane which is suppressed from clouding or causing a precipitate and which can suppress the occurrence of, for example, coating unevenness.

Further, according to the present invention, provided is the method of producing a member for electrophotography, which includes, as a surface layer, a thin film containing a polysiloxane, the thin film having a high dielectric constant, which is provided with excellent charging performance, and which is capable of providing a high-quality electrophotographic image.

Further features of the present invention will become apparent from the following description of exemplary embodiments with reference to the attached drawings.

BRIEF DESCRIPTION OF THE DRAWINGS

FIG. 3 is a schematic view of an apparatus for measuring the surface potential of a photosensitive drum.

DESCRIPTION OF THE EMBODIMENTS

Preferred embodiments of the present invention will now be described in detail in accordance with the accompanying drawings.

Figure 1:
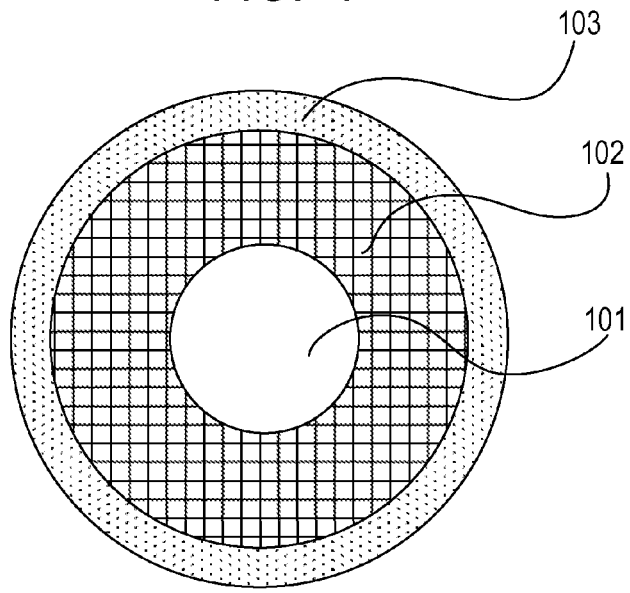
FIG. 1 is a sectional view of a member for electrophotography according to an embodiment of the present invention.

FIG. 1 illustrates a section of a member for electrophotography according to an embodiment of the present invention. The member for electrophotography has a support 101, an electro-conductive elastic layer 102, and a surface layer 103.

(Support)

As the support, a support having electro-conductivity is used. Specific examples thereof include a support made of a metal (made of an alloy) such as iron, copper, stainless steel, aluminum, an aluminum alloy, or nickel.

(Elastic Layer)

One kind or two or more kinds of elastic bodies such as rubbers used in the elastic layer (electro-conductive elastic layer) of a conventional charging member or the like can be used in the electro-conductive elastic layer. Examples of the rubbers include a urethane rubber, a silicone rubber, a butadiene rubber, an isoprene rubber, a chloroprene rubber, a styrene-butadiene rubber, an ethylene-propylene rubber, a polynorbornene rubber, a styrene-butadiene-styrene rubber, an acrylonitrile rubber, an epichlorohydrin rubber, and an alkyl ether rubber.

In addition, the electro-conductivity of the electro-conductive elastic layer can be set to a predetermined value by appropriately using an electro-conductive agent. The electrical resistance value of the electro-conductive elastic layer can be adjusted by appropriately selecting the kind and usage of the electro-conductive agent, and the electrical resistance value falls within the range of suitably $10^2$ to $10^8 \Omega$, more suitably $10^3$ to $10^6 \Omega$. In addition, as the electro-conductive agent for the electro-conductive elastic layer, electro-conductive carbons such as ketjen black EC, acetylene black, carbon for rubber, oxidized carbon for coloring (ink), and pyrolytic carbon may each be used. In addition, graphites such as natural graphite and artificial graphite may each be used as the electro-conductive agent for the electro-conductive elastic layer. An inorganic or organic filler, or a crosslinking agent may be added to the electro-conductive elastic layer.

The electro-conductive elastic layer is formed on the support from the raw materials for the electro-conductive elastic layer, which have been mixed with a closed mixer or the like, by a known method such as extrusion molding, injection molding, or compression molding. It should be noted that the electro-conductive elastic layer is bonded onto the support through an adhesive as required. The electro-conductive elastic layer formed on the support is subjected to a vulcanization treatment as required. When a vulcanizing temperature is rapidly increased, a volatile by-product such as a vulcanization accelerator caused by a vulcanization reaction gasifies to be responsible for a void. Therefore, the following is preferably adopted. A heating zone is divided into two zones. A gas component is sufficiently removed by keeping a first zone in such a state that the temperature in the zone is lower than the vulcanizing temperature. After that, vulcanization is performed in a second zone.

(Surface Layer)

(Surface-Layer Coating Liquid)

A surface-layer coating liquid contains a hydrolyzed condensate obtained by hydrolyzing and condensing a hydrolyzable silane compound represented by the following general formula (1) and a chelate titanium compound represented by the following general formula (2). After the coating liquid has been applied to the surface of the elastic layer, the hydrolyzed condensate in the coat is crosslinked by cleaving an epoxy group in the hydrolyzed condensate, whereby a surface layer formed of a polysiloxane thin film is formed.

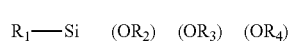 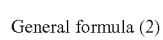  General formula (1)

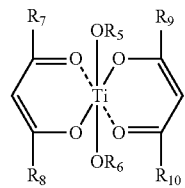  General formula (2)

In the general formula (1), $R_1$ represents a hydrocarbon group having an epoxy group represented by any one of the following general formulae (3) to (6), and $R_2$ to $R_4$ each independently represent a hydrocarbon group. Specific examples of the hydrocarbon group represented by each of $R_2$ to $R_4$ include an alkyl group having 1 or more and 4 or less carbon atoms.

In addition, in the general formula (2), $R_5$ and $R_6$ each independently represent a linear or branched alkyl group having 1 or more and 20 or less carbon atoms, preferably a lower alkyl group having 1 or more and 3 or less carbon atoms, and $R_7$ to $R_{10}$ each independently represent a hydrogen atom, an alkyl group having 1 or more and 3 or less carbon atoms, or an alkoxy group having 1 or more and 3 or less carbon atoms.

General formula (3)

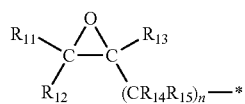

General formula (4)

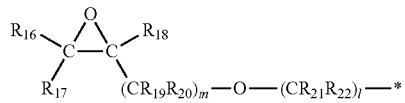

General formula (5)

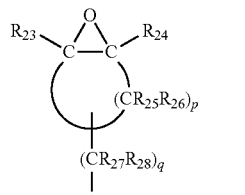

General formula (6)

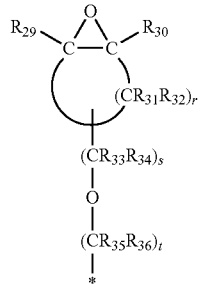

In the general formulae (3) to (6): $R_{11}$ to $R_{13}$, $R_{16}$ to $R_{18}$, $R_{23}$, $R_{24}$, $R_{29}$, and $R_{30}$ each independently represent a hydrogen atom, an alkyl group having 1 or more and 4 or less carbon atoms, a hydroxyl group, a carboxyl group, or an amino group; $R_{14}$, $R_{15}$, $R_{19}$ to $R_{22}$, $R_{27}$, $R_{28}$, and $R_{33}$ to $R_{36}$ each independently represent a hydrogen atom or an alkyl group having 1 or more and 4 or less carbon atoms; $R_{25}$, $R_{26}$, $R_{31}$, and $R_{32}$ each independently represent a hydrogen atom, an alkoxyl group having 1 or more and 4 or less carbon atoms, or an alkyl group having 1 or more and 4 or less carbon atoms; and n, m, l, q, s, and t each independently represent an integer of 1 or more and 8 or less, p and r each independently represent an integer of 4 or more and 12 or less, and "*" represents a bonding position with a silicon atom in the general formula (1).

Hereinafter, a chelate titanium compound having a structure represented by the general formula (2) is specifically exemplified and chemical structures thereof are shown.

(2-1): diisopropoxytitanium bis(acetylacetonate):

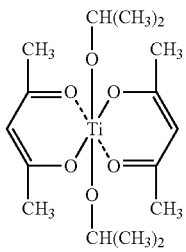

(2-2): diisopropoxytitanium bis(ethylacetoacetate):

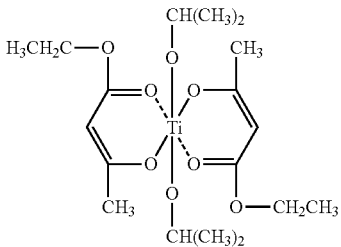

A hydrolyzable silane compound having a structure represented by the general formula (3) is specifically exemplified below: (3-1): 4-(1,2-epoxybutyl)trimethoxysilane; (3-2): 4-(1,2-epoxybutyl)triethoxysilane; (3-3): 5,6-epoxyhexyltrimethoxysilane; (3-4): 5,6-epoxyhexyltriethoxysilane; (3-5): 8-oxirane-2-yloctyltrimethoxysilane; and (3-6): 8-oxirane-2-yloctyltriethoxysilane.

A hydrolyzable silane compound having a structure represented by the general formula (4) is specifically exemplified below: (4-1): glycidoxypropyltrimethoxysilane; and (4-2): glycidoxypropyltriethoxysilane.

A hydrolyzable silane compound having a structure represented by the general formula (5) is specifically exemplified below: (5-1): 2-(3,4-epoxycyclohexyl)ethyltrimethoxysilane; and (5-2): 2-(3,4-epoxycyclohexyl)ethyltriethoxysilane.

A hydrolyzable silane compound having a structure represented by the general formula (6) is specifically exemplified below: (6-1): 3-(3,4-epoxycyclohexyl)methyloxypropyltrimethoxysilane; and (6-2): 3-(3,4-epoxycyclohexyl)methyloxypropyltriethoxysilane.

The rate of the dehydration condensation reaction of the hydrolyzable silane compound represented by the general formula (1) is extremely high. Accordingly, the storage stability of the surface-layer coating liquid needs to be additionally improved. That is, the dehydration condensation of the silane compound represented by the general formula (1) proceeds even in the coating liquid to produce a polysiloxane in the coating liquid and hence the liquid clouds in some cases. On the other hand, the rate of the hydrolysis reaction of the chelate titanium compound represented by the general formula (2) is lower than that of an alkoxysilane. In other words, the compound has higher stability against water than that of the alkoxysilane. Accordingly, causing the alkoxysilane represented by the formula (1) and the chelate titanium compound represented by the formula (2) to coexist in the coating liquid may be able to improve the storage stability of the coating liquid.

Upon production of the hydrolyzed condensate, a hydrolyzable silane compound represented by the following general formula (7) can be used in addition to the hydrolyzable silane compound represented by the general formula (1) and the chelate titanium compound represented by the general formula (2):

$$R_{37}\text{—}Si(OR_{38})(OR_{39})(OR_{40}) \qquad \text{General formula (7)}$$

In the general formula (7), $R_{37}$ represents an alkyl group having 1 or more and 10 or less carbon atoms or an aryl group such as a phenyl group, and $R_{38}$ to $R_{40}$ each independently represent a hydrocarbon group, and specific examples thereof include an alkyl group having 1 or more and 4 or less carbon atoms.

A hydrolyzable silane compound having a structure represented by the general formula (7) is specifically exemplified below: (7-1): methyltrimethoxysilane; (7-2): methyltriethoxysilane; (7-3): methyltripropoxysilane; (7-4): ethyltrimethoxysilane; (7-5): ethyltriethoxysilane; (7-6): ethyltripropoxysilane; (7-7): propyltrimethoxysilane; (7-8): propyltriethoxysilane; (7-9): propyltripropoxysilane; (7-10): hexyltrimethoxysilane; (7-11): hexyltriethoxysilane; (7-12): hexyltripropoxysilane; (7-13): decyltrimethoxysilane; (7-14): decyltriethoxysilane; (7-15): decyltripropoxysilane; (7-16): phenyltrimethoxysilane; (7-17): phenyltriethoxysilane; and (7-18): phenyltripropoxysilane.

When the hydrolyzable silane compound having a structure represented by the general formula (7) is used in combination, a hydrolyzable silane compound in which $R_{37}$ is a linear alkyl group having 6 to 10 carbon atoms and a hydrolyzable silane compound in which $R_{37}$ is a phenyl group are preferably combined. In this case, the compounds each show good compatibility with a solvent even when their monomer structures change owing to hydrolysis and condensation reactions.

Upon production of the hydrolyzed condensate, a hydrolyzable titanium compound represented by the following general formula (8) can be used in addition to the hydrolyzable silane compound represented by the general formula (1) and the chelate titanium compound represented by the general formula (2).

$$Ti\text{—}(OR_{41})(OR_{42})(OR_{43})(OR_{44}) \qquad \text{General formula (8)}$$

In the general formula (8), $R_{41}$ to $R_{44}$ each independently represent a hydrocarbon group. Here, an alkyl group having 1 or more and 6 or less carbon atoms is given as a specific example of the hydrocarbon group.

In addition, upon production of the hydrolyzed condensate, the hydrolyzable silane compound having a structure represented by the general formula (7) and the hydrolyzable titanium compound represented by the general formula (8) can be used in addition to the hydrolyzable silane compound represented by the general formula (1) and the chelate titanium compound represented by the general formula (2).

A hydrolyzable titanium compound having a structure represented by the general formula (8) is specifically exemplified below: (8-1): titanium methoxide; (8-2): titanium ethoxide; (8-3): titanium n-propoxide; (8-4): titanium i-propoxide; (8-5): titanium n-butoxide; (8-6): titanium t-butoxide; (8-7): titanium i-butoxide; (8-8): titanium nonyloxide; (8-9): titanium 2-ethylhexoxide; and (8-10): titanium methoxypropoxide.

When the hydrolyzed condensate is used as a coating liquid, a drying process after its application is desirably completed with ease and within a short time period. Accordingly, it is effective to replace part of the chelate titanium compound with the hydrolyzable titanium compound represented by the general formula (8).

In addition, a cationic polymerization catalyst as a photopolymerization initiator is preferably caused to coexist during the crosslinking reaction from the viewpoint of an improvement in crosslinking efficiency. For example, an epoxy group shows high reactivity for an onium salt of a Lewis acid activated with an active energy ray. Accordingly, when the cationically polymerizable group is an epoxy group, the onium salt of the Lewis acid is preferably used as the cationic polymerization catalyst.

Examples of other cationic polymerization catalysts include a borate, a compound having an imide structure, a compound having a triazine structure, an azo compound, and a peroxide. Of various cationic polymerization catalysts, an aromatic sulfonium salt and an aromatic iodonium salt are preferred from the viewpoints of sensitivity, stability, and reactivity. A bis(4-tert-butylphenyl)iodonium salt, a compound having a structure represented by the following chemical formula (9) (trade name: Adekaoptomer SP150, manufactured by ADEKA CORPORATION), or a compound having a structure represented by the following chemical formula (10) (trade name: IRGACURE 261, manufactured by Ciba Specialty Chemicals Inc.) is particularly preferred.

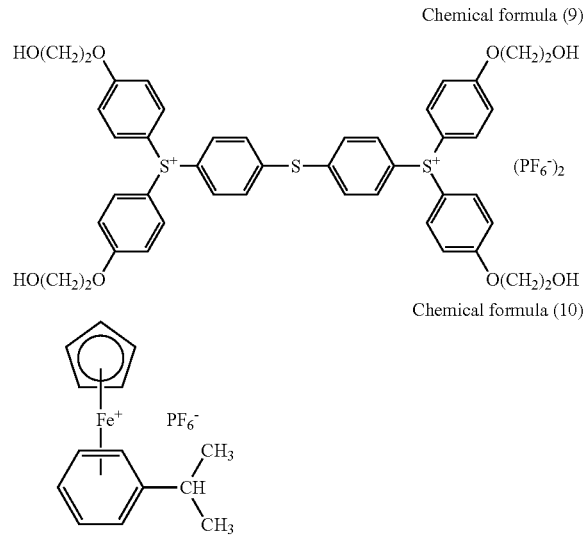

Chemical formula (9)

Chemical formula (10)

(Method of Producing Member for Electrophotography)

Hereinafter, a method of producing the member for electrophotography of the present invention is exemplified. A production method example 1 is a production method involving using the compounds having structures represented by the general formula (1) and the general formula (2). In addition, a production method example 2 is a production method involving using the compounds having structures represented by the general formula (1), the general formula (2), the general formula (7), and the general formula (8).

The production method example 1 includes the following first step (i) and second step (ii):

(i) the first step of forming, on the elastic layer placed on the outer periphery of the support, a coat of a coating liquid containing a hydrolyzed condensate of the compound having a structure represented by the general formula (1) and the compound having a structure represented by the general formula (2); and (ii) the second step of crosslinking the hydrolyzed condensate through the cleavage of an epoxy group in $R_1$ of the hydrolyzed condensate to form the surface layer.

It should be noted that in the case of the production method example 2, a hydrolyzed condensate of the compound having a structure represented by the general formula (1), the compound having a structure represented by the general formula (2), the compound having a structure represented by the general formula (7), and the compound having a structure represented by the general formula (8) is used in the step (i).

In the step (i) of the production method example 2, a step (iii) of adding the chelate titanium compound, the hydrolyzable titanium compound, water, and an alcohol to the hydrolyzable silane compounds to perform hydrolysis and condensation through reflux under heating (first-stage reaction) is performed. It should be noted that the following may be adopted. The hydrolyzable titanium compound represented by the general formula (8) is not added in the step (iii), and a step (iv) of adding the hydrolyzable titanium compound represented by the general formula (8) to the solution obtained in the step (iii) to perform hydrolysis and condensation (second-stage reaction) is separately provided.

Next, the step (ii) is preferably performed through a step (v) of adding the photopolymerization initiator to the solution obtained in the step (iv). It is because the reaction rate of each hydrolyzable silane compound and the reaction rate of the hydrolyzable titanium compound extremely differ from each other, that is, the reaction rate of the hydrolyzable titanium compound represented by the general formula (8) is extremely high that the two-stage synthesis reaction of the steps (iii) and (iv) is performed. When the amount of water to be added in the step (i) or the amount of moisture in the alcohol to be added in the step is excessive, it is effective to divide the reaction into two stages for sufficiently exerting a preventing effect of the chelate titanium compound represented by the general formula (2) on the occurrence of a precipitate or clouding. When the chelate titanium compound is not added or when the amount of moisture is large and the amount of the hydrolyzable titanium compound is large, the liquid clouds or causes a precipitate in some cases. The precipitation is the occurrence of $TiO_2$ fine particles. The occurrence of the fine particles is not preferred for performing coating with no coating unevenness.

Accordingly, the amount of moisture needs to be adjusted, and a ratio M (molar ratio) of the addition amount of water with respect to the hydrolyzable silane compounds upon synthesis of the coating liquid is preferably 0.3 or more and 9.0 or less.

$$M=\text{water}/(\text{hydrolyzable compound represented by general formula (1)}+\text{hydrolyzable compound represented by general formula (7)}) \quad \text{Calculation expression (1)}$$

The value is more preferably 1.2 or more and 3.0 or less. As long as the addition amount of water falls within the range, the extent of the condensation at the time of the synthesis can be easily controlled. The rate of the condensation can also be easily controlled, which is effective in stabilizing the life of the coating liquid.

In addition, a primary alcohol alone, a mixture of a primary alcohol and a secondary alcohol, or a mixture of a primary alcohol and a tertiary alcohol is preferably used as the alcohol for synthesizing the coating liquid. Ethanol alone, a mixture of methanol/2-butanol, or a mixture of ethanol/2-butanol is particularly preferred.

Next, the concentration of the resultant coating liquid is adjusted to a proper one, and the coating liquid is applied onto a member having a support and an electro-conductive elastic layer formed on the support. Upon preparation of the coating liquid, a proper solvent whose volatility has been taken into consideration as well as the solvent used in the synthesis may be used for improving its coatability. Examples of the proper solvent include 2-butanol, ethyl acetate, methyl ethyl ketone, and a mixture thereof.

In addition, upon application of the coating liquid onto the electro-conductive elastic layer, application with a roll coater, dip coating, ring application, or the like can be adopted.

Next, the coating liquid applied onto the electro-conductive elastic layer is irradiated with an active energy ray. As a result, cationically polymerizable groups in the coating liquid are cleaved to crosslink the coating liquid, and thus the coating liquid is cured by crosslinking. Ultraviolet light is preferred as the active energy ray. When the crosslinking reaction is performed with ultraviolet light, the deterioration of the electro-conductive elastic layer due to thermal hysteresis can be suppressed and reductions in electrical characteristics of the electro-conductive elastic layer can also be suppressed.

For the irradiation with UV light, a high-pressure mercury lamp, a metal halide lamp, a low-pressure mercury lamp, an excimer UV lamp, or the like can be used. Of those, a UV light source rich in UV light having a wavelength of 150 to 480 nm is used. It should be noted that the integral light quantity of UV light is defined in the following calculation expression (2).

$$\text{Integral light quantity of UV light (mJ/cm}^2\text{)}= \text{UV light intensity (mW/cm}^2\text{)} \times \text{irradiation time (s)} \quad \text{Calculation expression (2)}$$

The integral light quantity of UV light can be adjusted depending on the irradiation time, a lamp output, and a distance between the lamp and an object to be irradiated. In addition, the integral light quantity may be provided with a gradient within the irradiation time.

When a low-pressure mercury lamp is used, the integral light quantity of UV light can be measured with a UV integral actinometer "UIT-150-A" or "UVD-S254" manufactured by USHIO INC. When an excimer UV lamp is used, the integral light quantity of UV light can be measured with a UV integral actinometer "UIT-150-A" or "VUV-S172" manufactured by USHIO INC.

(Electrophotographic Apparatus)

The member for electrophotography of the present invention can be used as, for example, a charging member, developing roller, transfer roller, fixing device, or cleaning blade in an electrophotographic apparatus.

Figure 2:
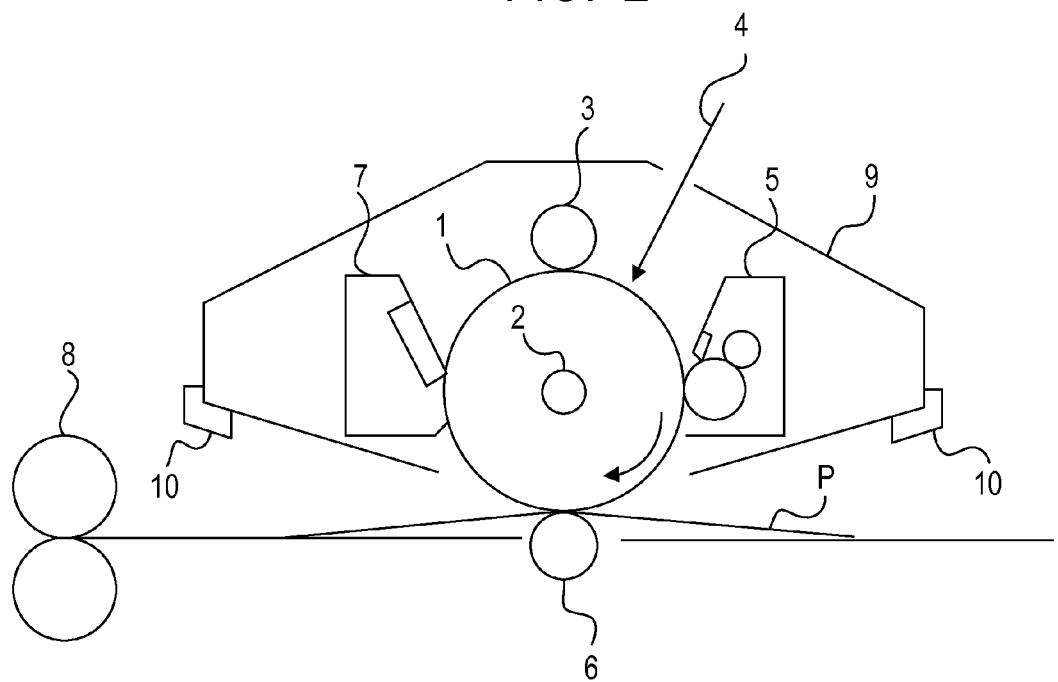
FIG. 2 is a sectional view of an electrophotographic apparatus according to the present invention.

FIG. 2 illustrates an example of the schematic construction of an electrophotographic apparatus provided with a process cartridge having the member for electrophotography (charging member) of the present invention. The electrophotographic apparatus has a cylindrical photosensitive member 1 to be rotationally driven around an axis 2 in the direction indicated by an arrow at a predetermined circumferential speed. The photosensitive member may have a support, and a photosensitive layer, a charge-injecting layer, a surface layer, and the like formed on the support.

The surface of the photosensitive member to be rotationally driven is uniformly charged to a positive or negative predetermined potential by a charging member 3. Next, the surface receives exposure light (image exposure light) 4 output from exposing device (not shown) such as slit exposure or laser beam scanning exposure so that electrostatic latent images corresponding to a target image may be formed.

The electrostatic latent images formed on the surface of the photosensitive member 1 are each supplied with a developer from a developing roller provided in developing device 5, and are then subjected to reversal development or normal development so as to turn into toner images. Next, the toner images on the surface of the photosensitive member 1 are sequentially transferred by a transfer bias applied to a transfer roller 6 onto a transfer material P such as paper conveyed to a gap between the photosensitive member 1 and the transfer roller 6 in synchronization with the rotation of the photosensitive member.

The transfer material P onto which the toner images have been transferred is separated from the surface of the photosensitive member 1, introduced into fixing device 8, and then output as an image-formed product (print or copy) to which the toner images have been fixed to the outside of the apparatus. In the case of a double image formation mode or a multiple image formation mode, the image-formed product is introduced into a recirculation conveying mechanism and then reintroduced into a transfer portion.

The surface of the photosensitive member 1 after the transfer of the toner images is cleaned through the removal of a transfer residual developer (toner) with cleaning device 7 such as a cleaning blade. Further, the surface is subjected to an antistatic treatment with pre-exposure light from pre-exposing device and then repeatedly used in image formation. When the charging device is contact charging device, the pre-exposure is not always required.

In the electrophotographic apparatus, a process cartridge 9 formed by integrating the photosensitive member 1, the charging member 3, the developing device 5, and the cleaning device 7 is detachably mountable to the main body of the electrophotographic apparatus with the guiding device 10 such as a rail of the main body of the electrophotographic apparatus. A cartridge formed of device appropriately selected from transferring device and the like in addition to the above-mentioned members can also be detachably mountable to the main body of the electrophotographic apparatus.

EXAMPLES

Hereinafter, the present invention is described in more detail by way of specific examples. It should be noted that "part(s)" in Examples is meant to refer to "part(s) by mass."

Examples 1 to 14 and Reference Examples 1 and 2

(1) Production and Evaluation of Electro-Conductive Elastic Roller
(Production of Electro-Conductive Elastic Roller 1)
Components (1), (2-1), (3), (4), and (5) in amounts shown in Table 1 were kneaded in a 6-L kneader for 20 minutes. Next, Components (6) and (7) in amounts shown in Table 1 were added to the mixture, and then the whole was kneaded with an open roll for an additional eight minutes. Thus, a kneaded product I was obtained.

TABLE 1

| Raw material | Usage |
| --- | --- |
| (1) Medium high nitrile (trade name: JSR N230SV (amount of combined acrylonitrile: 35.0%), Mooney viscosity (ML1 + 4 100° C.): 32, specific gravity: 0.98, manufactured by JSR Corporation) | 100 parts |
| (2-1) Carbon black for coloring (trade name: #7360SB, particle diameter: 28 nm, nitrogen adsorption specific surface area: 77 m$^2$/g, DBP absorption: 87 cm$^3$/100 g, manufactured by TOKAI CARBON CO., LTD.) (filler) | 48 parts |
| (3) Calcium carbonate (filler) (trade name: NANOX #30, manufactured by MARUO CALCIUM CO., LTD.) | 20 parts |

TABLE 1-continued

| Raw material | Usage |
| --- | --- |
| (4) Zinc oxide | 5 parts |
| (5) Zinc stearate | 1 part |
| (6) Tetrabenzylthiuram disulfide (trade name: Sanceler TBZTD, manufactured by SANSHIN CHEMICAL INDUSTRY CO., LTD.) (vulcanization accelerator) | 4.5 parts |
| (7) Sulfur (vulcanizing agent) | 1.2 parts |
| (2-2) Carbon black for coloring (trade name: #1170, particle diameter: 21 nm, nitrogen adsorption specific surface area: 110 m$^2$/g, DBP absorption: 55 cm$^3$/100 g, manufactured by Columbian Carbon) | 26 parts |
| (2-3) Carbon black SRF-LM carbon (trade name: "HTC#SL" manufactured by NSCC CARBON CO., LTD.) | 60 parts |

Next, a thermosetting adhesive containing a metal and a rubber (trade name: METALOC N-33, manufactured by TOYO KAGAKU KENKYUSHO CO., LTD.) was applied onto a region extending by up to 115.5 mm on both sides each with respect to the center in the axial direction of the columnar surface of a support made of steel having a diameter of 6 mm and a length of 252 mm (having a nickel-plated surface) (region having a total width in the axial direction of 231 mm). The resultant was dried at a temperature of 80° C. for 30 minutes, and was then further dried at a temperature of 120° C. for 1 hour.

Next, the kneaded product I was coaxially extruded into a cylindrical shape having an outer diameter of 8.75 to 8.90 mm with a crosshead extruder onto the peripheral surface of the support having formed thereon the adhesive layer. After that, the end portions of the cylindrical kneaded product I were cut. Thus, the outer periphery of the support was covered with a layer (length: 242 mm) of the unvulcanized kneaded product I. It should be noted that the extruder used for extruding the kneaded product I had a cylinder diameter of 70 mm and an L/D of 20. In addition, with regard to temperature conditions at the time of the extrusion, the temperature of a head was set to 90° C., the temperature of the cylinder was set to 90° C., and the temperature of a screw was set to 90° C.

Next, the layer of the unvulcanized kneaded product I covering the outer periphery of the support was vulcanized with a continuous heating furnace having two zones set to different temperatures. Specifically, the support was passed through a first zone whose temperature had been set to 80° C. for 30 minutes, and was then passed through a second zone whose temperature had been set to 160° C. for 30 minutes, thereby vulcanizing the layer of the unvulcanized kneaded product I. Thus, an electro-conductive elastic layer covering the outer periphery of the support was formed.

Next, both ends of the electro-conductive elastic layer were cut so that the part of the electro-conductive elastic layer had a width in an axial direction of 232 mm. Subsequently, the surface of the electro-conductive elastic layer was ground with a rotary grindstone. Thus, an electro-conductive elastic roller-1 having the electro-conductive elastic layer of a crown shape having a diameter at each end of 8.26 mm and a diameter at the central portion of 8.5 mm was obtained.

(2) Preparation and Evaluation of Surface-Layer Coating Liquid
<Synthesis of Condensate Intermediate-1>
Materials shown in Table 2 below were loaded into a 300-ml eggplant flask and then mixed.

TABLE 2

| Material | Blending amount (g) |
| --- | --- |
| <Hydrolyzable silane compound having epoxy group according to general formula (1); EP-1> 3-Glycidoxypropyltrimethoxysilane (trade name: KBM-403, manufactured by Shin-Etsu Chemical Co., Ltd.) | 11.44 (0.048 mol) |
| <Hydrolyzable silane compound according to general formula (7); He> Hexyltrimethoxysilane (He) (trade name: KBM-3063, manufactured by Shin-Etsu Chemical Co., Ltd.) | 60.77 (0.293 mol) |
| <Chelate titanium compound according to general formula (2); C-Ti-1> Diisopropoxytitanium bis(acetylacetonate) (manufactured by Matsumoto Fine Chemical Co., Ltd.) | 8.28 (0.017 mol) |

Next, 92.63 g of 2-butanol (2-BuOH) (KISHIDA CHEMICAL Co., Ltd., special grade) and 3.69 g of ion-exchanged water were further added. At this time, a theoretical solid content at the time of the complete condensation of the raw materials was set to 28.00 mass %.

The mixture of the respective components was stirred at room temperature (23° C.) for 30 minutes and then stirred while being heated with an oil bath. The oil was heated so that its temperature reached 120° C. in 20 minutes from the initiation of the heating. After that, reflux under heating was performed for 5 hours while the temperature of the oil was maintained at 120° C. Thus, a condensate intermediate-1 was obtained. It should be noted that each of both the stirring at room temperature and the stirring under heating was performed at the number of rotations of 300 rpm.

<Preparation of Condensate Intermediates-2 to 17>

Condensate intermediates-2 to 17 were each prepared in the same manner as in the condensate intermediate-1 except that a composition shown in Table 3 below was adopted. It should be noted that the symbols "EP-1" to "EP-3", "He", "Ph", "C—Ti-1" to "C—Ti-3", and "Ti-1" in Table 3 each represent a compound shown in Table 14.

<Synthesis of Condensate 1-1>

116.28 Grams of the condensate intermediate-1 were loaded into a 300-ml eggplant flask. 60.52 Grams (0.211 mol) of tetraisopropoxy titanium (Ti-1) (manufactured by Kojundo Chemical Laboratory Co., Ltd.) were added to the flask and then the mixture was stirred at room temperature for 3 hours, followed by the performance of hydrolysis and condensation reactions. Thus, a condensate 1-1 was obtained. The number of rotations at the time of the stirring was set to 300 rpm.

<Preparation of Condensates 1-2 and 1-3>

Condensates 1-2 and 1-3 were each prepared in the same manner as in the condensate 1-1 except that the blending amount of the condensate intermediate-1 and the blending amount of Ti-1 were changed as shown in Table 4.

<Preparation of Condensates 2-1 to 2-3, 3-1 to 3-3, 4 to 13, and 14-1 to 14-4>

Condensates 2-1 to 2-3, 3-1 to 3-3, 4 to 13, and 14-1 to 14-4 were prepared in the same manner as in the condensate 1-1 except that the condensate intermediate and its blending amount, and the blending amounts of Ti-1 to Ti-3 were changed as shown in Table 4. It should be noted that the symbols "Ti-1" to "Ti-3" in Table 4 each represent a compound shown in Table 14.

TABLE 4

| Condensate No. | Condensate intermediate No. | Blending amount (g) | Hydrolyzable compound according to general formula (8) | | |
| --- | --- | --- | --- | --- | --- |
| | | | Ti-1 (g) | Ti-2 (g) | Ti-3 (g) |
| 1-1 | 1 | 116.28 | 60.52 | — | — |
| 1-2 | | 27.40 | 149.40 | — | — |
| 1-3 | | 172.13 | 4.67 | — | — |
| 2-1 | 2 | 116.28 | 60.52 | — | — |
| 2-2 | | 27.40 | 149.40 | — | — |
| 2-3 | | 172.13 | 4.67 | — | — |
| 3-1 | 3 | 116.28 | 60.52 | — | — |
| 3-2 | | 27.40 | 149.40 | — | — |
| 3-3 | | 172.13 | 4.67 | — | — |
| 4 | 4 | 117.80 | 59.00 | — | — |

TABLE 3

| Condensate intermediate No. | Hydrolyzable compound according to general formula (1) | | | Hydrolyzable compound according to general formula (7) | | Chelate titanium compound according to general formula (2) | | | Hydrolyzable compound according to general formula (8) | Water (g) | 2-BuOH (g) |
| --- | --- | --- | --- | --- | --- | --- | --- | --- | --- | --- | --- |
| | EP-1 (g) | EP-2 (g) | EP-3 (g) | He (g) | Ph (g) | C—Ti-1 (g) | C—Ti-2 (g) | C—Ti-3 (g) | Ti-1 (g) | | |
| 1 | 11.44 | — | — | 60.77 | — | 8.28 | — | — | — | 3.69 | 92.63 |
| 2 | 11.44 | — | — | 60.77 | — | 8.28 | — | — | — | 22.15 | 74.17 |
| 3 | 11.44 | — | — | 60.77 | — | 8.28 | — | — | — | 1.85 | 94.47 |
| 4 | — | 14.63 | — | 58.48 | — | 7.97 | — | — | — | 3.55 | 92.16 |
| 5 | — | — | 11.64 | 60.16 | — | 8.20 | — | — | — | 3.66 | 93.14 |
| 6 | 69.36 | — | — | — | — | 7.03 | — | — | — | 3.14 | 97.27 |
| 7 | 11.78 | — | — | 21.84 | 47.29 | 8.53 | — | — | — | 3.8 | 83.56 |
| 8 | 11.44 | — | — | 60.77 | — | — | 15.08 | — | — | 3.69 | 85.82 |
| 9 | 11.44 | — | — | 60.77 | — | — | 15.08 | — | — | 22.15 | 67.37 |
| 10 | 11.44 | — | — | 60.77 | — | — | 15.08 | — | — | 1.85 | 87.67 |
| 11 | 11.44 | — | — | 60.77 | — | — | — | 7.61 | — | 3.69 | 93.29 |
| 12 | 11.44 | — | — | 60.77 | — | — | — | 7.61 | — | 22.15 | 74.88 |
| 13 | 11.44 | — | — | 60.77 | — | — | — | 7.61 | — | 1.85 | 95.14 |
| 14 | 11.44 | — | — | 60.77 | — | 8.28 | — | — | — | 3.69 | 92.63 |
| 15 | 7.51 | — | — | 39.91 | — | 5.44 | — | — | 61.07 | 2.42 | 60.46 |
| 16 | 7.51 | — | — | 39.91 | — | 108.75 | — | — | — | 2.42 | 18.21 |
| 17 | 48.04 | — | — | — | — | 97.38 | — | — | — | 2.17 | 29.21 |

TABLE 4-continued

| Condensate No. | Condensate intermediate No. | Condensate intermediate Blending amount (g) | Hydrolyzable compound according to general formula (8) Ti-1 (g) | Hydrolyzable compound according to general formula (8) Ti-2 (g) | Hydrolyzable compound according to general formula (8) Ti-3 (g) |
|---|---|---|---|---|---|
| 5 | 5 | 116.68 | 60.12 | — | — |
| 6 | 6 | 122.62 | 54.19 | — | — |
| 7 | 7 | 115.09 | 61.71 | — | — |
| 8 | 8 | 118.05 | 58.75 | — | — |
| 9 | 9 | 118.05 | 58.75 | — | — |
| 10 | 10 | 118.05 | 58.75 | — | — |
| 11 | 11 | 116.11 | 60.69 | — | — |
| 12 | 12 | 116.11 | 60.69 | — | — |
| 13 | 13 | 116.11 | 60.69 | — | — |
| 14-1 | 14 | 81.49 | — | 95.31 | — |
| 14-2 | | 85.76 | — | — | 91.04 |
| 14-3 | | 116.28 | 60.52 | — | — |
| 14-4 | | 116.28 | 60.52 | — | — |

<Preparation of Condensates 15 to 17>

Condensates 15 to 17 were each prepared in the same manner as in the condensate 1-1 except that a composition shown in Table 5 below was adopted. It should be noted that the symbols "EP-1", "He", "C—Ti-1", and "Ti-1" in Table 5 each represent a compound shown in Table 14.

TABLE 5

| Condensate No. | Hydrolyzable compound according to general formula (1) EP-1 (g) | Hydrolyzable compound according to general formula (7) He (g) | Chelate titanium compound according to general formula (2) C—Ti-1 (g) | Hydrolyzable compound according to general formula (8) Ti-1 (g) | Water (g) | 2-BuOH (g) |
|---|---|---|---|---|---|---|
| 15 | 7.51 | 39.91 | 5.44 | 61.07 | 2.42 | 60.46 |
| 16 | 7.51 | 39.91 | 108.75 | — | 2.42 | 18.21 |
| 17 | 48.04 | — | 97.38 | — | 2.17 | 29.21 |

Each condensate according to the present invention prepared in the foregoing was subjected to the following evaluation (1).

(Evaluation (1): Stability of Condensate)

The external appearance of the condensate was visually observed and then evaluated according to criteria shown in Table 6 below.

TABLE 6

| Rank | Evaluation criterion |
|---|---|
| A | No precipitate is observed and the condensate is transparent. |
| B | No precipitate is observed but the condensate is in a state of being slightly turbid. |
| C | No precipitate is observed but the condensate is in a state of clouding. |
| D | A precipitate occurs. |

Table 7 shows the results of the evaluation (1).

TABLE 7

| Condensate No. | Evaluation (1) |
|---|---|
| 1-1 | A |
| 1-2 | B |
| 1-3 | A |
| 2-1 | B |
| 2-2 | B |
| 2-3 | A |
| 3-1 | A |
| 3-2 | A |
| 3-3 | A |
| 4 | A |
| 5 | A |
| 6 | A |
| 7 | A |
| 8 | A |
| 9 | A |
| 10 | A |
| 11 | A |
| 12 | A |
| 13 | A |
| 14-1 | A |
| 14-2 | A |
| 14-3 | B |
| 14-4 | A |
| 15 | A |
| 16 | A |
| 17 | B |

<Preparation of Coating Liquid>

Coating liquids 1-1 to 1-3, 2-1 to 2-3, 3-1 to 3-3, 4 to 13, 14-1 to 14-4, and 15 to 17 were prepared according to the following procedure with the respective condensates.

First, a polymerization initiator solution was prepared by using an aromatic sulfonium salt (trade name: Adekaoptomer SP-150, manufactured by ADEKA CORPORATION) as a photocationic polymerization initiator so that its concentration in methanol became 10 mass %. Subsequently, the polymerization initiator solution was added at a ratio of 330.43 g with respect to 1 mol of the $R_1$ group in each condensate. After that, a theoretical solid content was adjusted with ethanol so as to become a concentration shown in Table 13. Thus, coating liquids 1-1 to 1-3, 2-1 to 2-3, 3-1 to 3-3, 4 to 13, 14-1 to 14-4, and 15 to 17 were prepared.

(3) Production and Evaluation of Member for Electrophotography

<Formation of Coat of Coating Liquid>

Next, each coating liquid prepared in the foregoing was applied onto the electro-conductive elastic roller 1 by ring application (discharge amount: 0.120 ml/s, speed of a ring portion: 85 mm/s, total discharge amount: 0.130 ml).

<Curing of Coat of Coating Liquid and Forming of Surface Layer>

Next, the coat of each coating liquid applied by the ring application was irradiated with ultraviolet light having a wavelength of 254 nm so that an integral light quantity became 9,000 mJ/cm². It should be noted that a low-pressure mercury lamp (manufactured by HARISON TOSHIBA LIGHTING Corporation) was used in the irradiation with the ultraviolet light. Thus, the coat was crosslinked and cured to form a surface layer having a thickness of 100 nm, whereby members for electrophotography 1-1 to 1-3, 2-1 to 2-3, 3-1 to 3-3, 4 to 13, 14-1 to 14-4, and 15 to 17 were produced. The resultant members for electrophotography were subjected to the following evaluations (2) and (3).

(Evaluation (2): Evaluation for Coatability of Coating Liquid)

The external appearance of the surface layer of each of the resultant members for electrophotography was visually observed and then coatability at the time of forming the coat of the coating liquid was evaluated according to criteria shown in Table 8 below.

TABLE 8

| Rank | Criterion |
| --- | --- |
| A | Thickness unevenness resulting from coating unevenness is not observed. |
| B | Thickness unevenness resulting from coating unevenness is observed in part of an end portion. |
| C | Thickness unevenness resulting from coating unevenness is observed in the entire surface. |

Table 13 shows the results of the evaluation. In addition, it was confirmed that when an image evaluation was performed by using the member for electrophotography according to each example as a charging roller, no adverse effect on an image to be noted appeared as in a member produced without the use of the chelate titanium compound represented by the general formula (2).

(Evaluation (3): Evaluation for Charging Ability)

An apparatus illustrated in FIG. 3 was used in an evaluation for a charging ability with respect to a process speed. The surface potential of a photosensitive drum 21 was measured with a surface potentiometer 20 by: applying a predetermined charging bias from a charging bias power source S1 to a charging member 22 in contact with the photosensitive drum 21; and exposing the image of the photosensitive drum to light from an exposing apparatus 23. At this time, the number of rotations of the photosensitive drum was changed, and the process speed was changed to a low speed (73.5 mm/sec) and a high speed (173.5 mm/sec). In addition, a ΔVd obtained by subtracting a drum potential V2 at the high speed from a drum potential V1 at the low speed was used as an indicator of the charging ability. It should be noted that a photosensitive drum mounted on a process cartridge (trade name: CRG-316BLK, manufactured by Canon Inc.) was used as the photosensitive drum. Evaluation criteria for the ΔVd are as shown in Table 9 below. It should be noted that Japanese Patent Application Laid-Open No. 2011-154353 describes that a smaller value for the ΔVd means that the level of a positive ghost at each of both the low speed and the high speed is alleviated.

TABLE 9

| Rank | Evaluation criterion |
| --- | --- |
| AA | 0 V ≤ ΔVd ≤ 3 V |
| A | 3 V < ΔVd ≤ 6 V |
| B | 6 V < ΔVd ≤ 9 V |
| C | 9 V < ΔVd ≤ 15 V |
| D | 15 V < ΔVd |

Comparative Example 1

Preparation of Condensate Intermediate C-1

A condensate intermediate C-1 was prepared in the same manner as in the condensate intermediate-1 except that a composition shown in Table 10 below was adopted. It should be noted that symbols "Ph" and "Ti-1" in Table 10 each represent a compound shown in Table 14.

TABLE 10

| Condensate intermediate No. | Hydrolyzable compound according to general formula (7) Ph (g) | Hydrolyzable compound according to general formula (8) Ti-1 (g) | Water (g) | 2-BuOH (g) |
| --- | --- | --- | --- | --- |
| C-1 | 91.97 | — | 12.43 | 72.40 |

<Preparation of Condensate C-1>

A condensate C-1 was prepared in the same manner as in the condensate 1-1 except that a composition shown in Table 11 below was adopted, and then the condensate was subjected to the evaluation (1). Table 11 shows the result together with the composition. It should be noted that the symbol "Ti-1" in Table 11 represents a compound shown in Table 14.

TABLE 11

| Condensate No. | Condensate intermediate No. | Condensate intermediate Blending amount (g) | Hydrolyzable compound according to general formula (8) Ti-1 (g) | Evaluation (1) |
| --- | --- | --- | --- | --- |
| C-1 | C-1 | 79.56 | 97.24 | C |

<Preparation of Coating Liquid C-1>

A coating liquid C-1 was prepared in the same manner as in the coating liquid 1-1 except that the condensate C-1 was used and the photocationic polymerization initiator was not used.

<Production and Evaluation of Member for Electrophotography C-1>

A member for electrophotography C-1 was produced in the same manner as in the member for electrophotography 1-1 except that this coating liquid was used, and then the member was subjected to the evaluations (2) and (3).

Comparative Example 2

Preparation of Condensate C-2

A condensate C-2 was prepared in the same manner as in the condensate 1-1 except that a composition shown in Table 12 below was adopted, and then the condensate was subjected to the evaluation (1). Table 12 shows the result together with the composition.

<Preparation of Coating Liquid C-2>

The preparation of a coating liquid C-2 was attempted in the same manner as in the coating liquid 1-1 except that the condensate C-2 was used and the photocationic polymerization initiator was not used. However, a uniform coating liquid could not be prepared because clouding and a precipitate occurred in the condensate C-2. Accordingly, the evaluations (2) and (3) were not performed. It should be noted that the symbols "Ph" and "Ti-1" in Table 12 each represent a compound shown in Table 14.

TABLE 12

| Condensate No. | Hydrolyzable compound according to general formula (7) Ph (g) | Hydrolyzable compound according to general formula (8) Ti-1 (g) | Water (g) | 2-BuOH (g) | Evaluation (1) |
|---|---|---|---|---|---|
| C-2 | — | 88.94 | 10.06 | 77.80 | D |

Table 13 shows the results of the evaluations (2) and (3) of the members for electrophotography according to Examples 1 to 17, and Comparative Examples 1 and 2.

TABLE 13

| | Dilution concentration (%) | Member for electrophotography No. | Evaluation 2 | Evaluation 3 |
|---|---|---|---|---|
| Example 1 | 1 | 1-1 | A | A |
| | 1 | 1-2 | A | B |
| | 1 | 1-3 | A | AA |
| Example 2 | 1 | 2-1 | B | B |
| | 1 | 2-2 | B | B |
| | 1 | 2-3 | A | AA |
| Example 3 | 1 | 3-1 | A | B |
| | 1 | 3-2 | A | B |
| | 1 | 3-3 | A | AA |
| Example 4 | 1 | 4 | A | A |
| Example 5 | 1 | 5 | A | A |
| Example 6 | 1 | 6 | A | A |
| Example 7 | 1 | 7 | A | A |
| Reference Example 1 | 1 | 8 | A | A |
| Reference Example 2 | 1 | 9 | B | A |
| Reference Example 3 | 1 | 10 | A | A |
| Example 8 | 1 | 11 | A | A |
| Example 9 | 1 | 12 | B | A |
| Example 10 | 1 | 13 | A | A |
| Example 11 | 1 | 14-1 | A | A |
| | 1 | 14-2 | A | A |
| | 5 | 14-3 | A | A |
| | 10 | 14-4 | A | C |
| Example 12 | 1 | 15 | A | C |
| Example 13 | 1 | 16 | A | A |
| Example 14 | 1 | 17 | A | A |
| Comparative Example 1 | 1 | C-1 | C | C |
| Comparative Example 2 | 1 | — | — | — |

TABLE 14

| Symbol | Compound name | Structure | Company name |
|---|---|---|---|
| EP-1 | 3-Glycidoxypropyltrimethoxysilane | 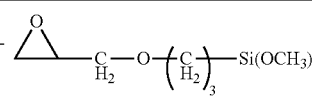 | Manufactured by Shin-Etsu Chemical Co., Ltd. |
| EP-2 | 8-Oxirane-2-yloctyltriethoxysilane | 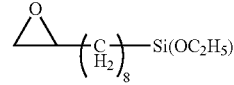 | Manufactured by SiKEMIA |
| EP-3 | 2-(3,4-Epoxycyclohexyl)ethyl-trimethoxysilane | 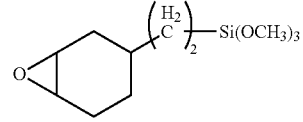 | Manufactured by Shin-Etsu Chemical Co., Ltd. |
| He | Hexyltrimethoxysilane | $H_3C-(CH_2)_5-Si(OCH_3)_3$ | Manufactured by Shin-Etsu Chemical Co., Ltd. |
| Ph | Phenyltriethoxysilane | 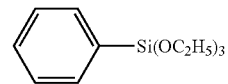 | Manufactured by Shin-Etsu Chemical Co., Ltd. |
| C-Ti-1 | Diisopropoxytitanium bis(acetylacetonate) | $Ti(O-i-C_3H_7)_2(C_5H_7O_2)_2$ | Trade name: Orgatics TC-100; manufactured by Matsumoto Fine Chemical Co., Ltd. |
| C-Ti-2 | Di-2-ethylhexoxytitanium bis(2-ethyl-3-hydroxyhexoxide) | $Ti(OC_8H_{17})_2(C_8H_{17}O_2)_2$ | Trade name: Orgatics TC-200; manufactured by Matsumoto Fine Chemical Co., Ltd. |
| C-Ti-3 | Diisopropoxytitanium bis(ethylacetoacetate) | $Ti(O-i-C_3H_7)_2(C_6H_9O_3)_2$ | Trade name: Orgatics TC-750; manufactured by Matsumoto Fine Chemical Co., Ltd. |
| Ti-1 | Titanium isopropoxide | $Ti(O-i-C_3H_7)_4$ | Manufactured by Kojundo Chemical Laboratory Co., Ltd. |
| Ti-2 | Titanium tetranonyloxide | $Ti(O-C_9H_{19})_4$ | Manufactured by Kojundo Chemical Laboratory Co., Ltd. |

TABLE 14-continued

| Symbol | Compound name | Structure | Company name |
|---|---|---|---|
| Ti-3 | Titanium (tetra-2-ethylhexoxide) | 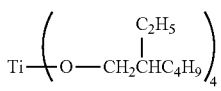 | Manufactured by Gelest, Inc. |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-078170, filed Mar. 29, 2012, which is hereby incorporated by reference herein in its entirety.

What is claimed is:

1. A method of producing a member for electrophotography comprising an electro-conductive support, an elastic layer, and a surface layer, the method comprising:
a first step of forming, on a surface of the elastic layer, a coat of a surface-layer coating liquid containing a hydrolyzed condensate of a hydrolyzable silane compound represented by the following general formula (1) and a chelate titanium compound represented by the following general formula (2); and
a second step of crosslinking the hydrolyzed condensate in the coat through cleavage of an epoxy group in the hydrolyzed condensate to form the surface layer:

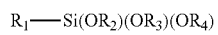
General formula (1)

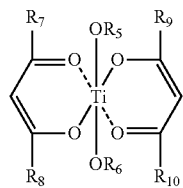
General formula (2)

in the general formula (1), $R_1$ represents a hydrocarbon group represented by any one of the following general formulae (3) to (6), and $R_2$ to $R_4$ each independently represent a hydrocarbon group;
in the general formula (2), $R_5$ and $R_6$ each independently represent a linear or branched alkyl group having 1 or more and 20 or less carbon atoms, and $R_7$ to $R_{10}$ each independently represent a hydrogen atom, an alkyl group having 1 or more and 3 or less carbon atoms, or an alkoxy group having 1 or more and 3 or less carbon atoms;

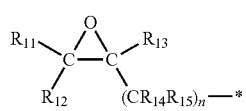
General formula (3)

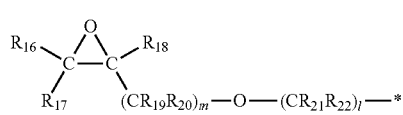
General formula (4)

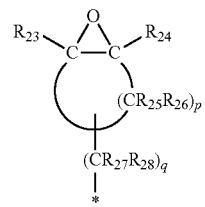
General formula (5)

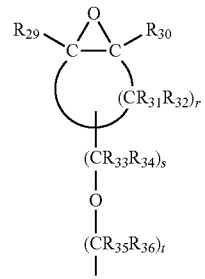
General formula (6)

in the general formulae (3) to (6):
$R_{11}$ to $R_{13}$, $R_{16}$ to $R_{18}$, $R_{23}$, $R_{24}$, $R_{29}$, and $R_{30}$ each independently represent a hydrogen atom, an alkyl group having 1 or more and 4 or less carbon atoms, a hydroxyl group, a carboxyl group, or an amino group;
$R_{14}$, $R_{15}$, $R_{19}$ to $R_{22}$, $R_{27}$, $R_{28}$, and $R_{33}$ to $R_{36}$ each independently represent a hydrogen atom or an alkyl group having 1 or more and 4 or less carbon atoms;
$R_{25}$, $R_{26}$, $R_{31}$, and $R_{32}$ each independently represent a hydrogen atom, an alkoxyl group having 1 or more and 4 or less carbon atoms, or an alkyl group having 1 or more and 4 or less carbon atoms; and
n, m, l, q, s, and t each independently represent an integer of 1 or more and 8 or less, p and r each independently represent an integer of 4 or more and 12 or less, and "*" represents a bonding position with a silicon atom in the general formula (1).

2. The method of producing a member for electrophotography according to claim 1, wherein:
the hydrolyzed condensate comprises
a hydrolyzed condensate of the hydrolyzable silane compound represented by the general formula (1),
the chelate titanium compound represented by the general formula (2), and
a hydrolyzable silane compound represented by the following general formula (7):

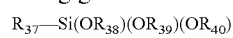
General formula (7)

in the general formula (7), $R_{37}$ represents an alkyl group or an aryl group and $R_{38}$ to $R_{40}$ each independently represent a hydrocarbon group.

3. The method of producing a member for electrophotography according to claim 1, wherein:
the hydrolyzed condensate comprises
a hydrolyzed condensate of the hydrolyzable silane compound represented by the general formula (1), the chelate titanium compound represented by the general formula (2), and a hydrolyzable titanium compound represented by the following general formula (8):

Ti—(OR$_{41}$)(OR$_{42}$)(OR$_{43}$)(OR$_{44}$)  General formula (8)

in the general formula (8), R$_{41}$ to R$_{44}$ each independently represent a hydrocarbon group.

4. The method of producing a member for electrophotography according to claim 1, wherein:

the hydrolyzed condensate comprises a hydrolyzed condensate of the hydrolyzable silane compound represented by the general formula (1), the chelate titanium compound represented by the general formula (2), a hydrolyzable silane compound represented by the following general formula (7), and a hydrolyzable titanium compound represented by the following general formula (8):

R$_{37}$—Si(OR$_{38}$)(OR$_{39}$)(OR$_{40}$)  General formula (7)

in the general formula (7), R$_{37}$ represents an alkyl group or an aryl group and R$_{38}$ to R$_{40}$ each independently represent a hydrocarbon group;

Ti—(OR$_{41}$)(OR$_{42}$)(OR$_{43}$)(OR$_{44}$)  General formula (8)

in the general formula (8), R$_{41}$ to R$_{44}$ each independently represent a hydrocarbon group.

5. The method of producing a member for electrophotography according to claim 1, wherein the chelate titanium compound represented by the general formula (2) is diisopropoxytitanium bis(acetylacetonate) or diisopropoxytitanium bis(ethylacetoacetate).

* * * * *